United States Patent [19]

Cuel et al.

[11] 4,420,763

[45] Dec. 13, 1983

[54] ELECTROMECHANICAL PRINTING DEVICE FOR A PRINTER OF THE SERIES-PARALLEL TYPE

[75] Inventors: Renaud Cuel; Henri Le Gledic; Yvon Le Meur, all of Paris, France

[73] Assignee: Thomson-CSF, Paris, France

[21] Appl. No.: 340,018

[22] Filed: Jan. 18, 1982

[30] Foreign Application Priority Data

Jan. 27, 1981 [FR] France ............................... 81 01464

[51] Int. Cl.$^{3}$ ............................................ G01D 15/24

[52] U.S. Cl. .......................... 346/139 R; 346/76 PH; 400/120; 400/185

[58] Field of Search ............. 346/139 R, 136, 76 PH; 400/185, 120

[56] References Cited

U.S. PATENT DOCUMENTS

| | | | |
|---|---|---|---|
| 3,951,247 | 4/1976 | Montanari | 400/120 |
| 4,077,336 | 3/1978 | Talvard | 400/124 X |
| 4,238,806 | 12/1980 | Bovio | 346/76 PH |

FOREIGN PATENT DOCUMENTS

| | | |
|---|---|---|
| 20212 | 10/1980 | European Pat. Off. . |
| 2015433 | 12/1979 | United Kingdom . |
| 2046177 | 12/1980 | United Kingdom . |

*Primary Examiner*—Joseph W. Hartary

[57] ABSTRACT

A device is provided comprising a printing head for printing a sheet, a rotary motor, and transmission means transforming the rotary movement generated by the motor, on the one hand into a reciprocating rectilinear movement driving the printing head and, on the other hand into a movement driving the printing sheet in synchronism with the reciprocating movement of the printing head.

1 Claim, 3 Drawing Figures

ELECTROMECHANICAL PRINTING DEVICE FOR A PRINTER OF THE SERIES-PARALLEL TYPE

BACKGROUND OF THE INVENTION

The present invention relates to electromechanical printing devices for printers of the series-parallel type.

Series-parallel type printers are well known. Their printing head is reciprocated with a rectilinear motion parallel to the lines of printing and comprises n elements (n being a positive whole number) each able to print a succession of k consecutive dots along a line (k being a positive whole number). To provide movement of the printing head, present-day printers use a rotary motor coupled to an eccentric (or to a cam) placed in an aperture provided in the printing head. Furthermore, these printers comprise an auxiliary rotary motor coupled to a device for moving the printing sheet and a circuit for controlling the motors. This circuit controls the motors so as to reciprocate the printing head with a linear movement parallel to the lines of printing and so as to advance the printing sheet as soon as the printing of one line is finished. The two motors and their control circuit have the disadvantage of being expensive.

Furthermore, a printing device is known comprising a single motor, a roller supporting a sheet, a fixed printing head, first transmission means transforming the rotary movement supplied by the motor into a rotational movement of the roller about its axis, so as to cause said sheet to advance, second transmission means for transforming the rotary movement generated by said motor into a reciprocating rectilinear movement applied to the roller, parallel to its axis and synchronous with the movement of said sheet. Such a device is described in European patent application No. 80 400632.8, it has as drawback difficult access to the sheet, since the printing head is fixed to the frame, on the one hand and, on the other hand, the roller is connected to the frame by two mechanical transmission systems, one for providing its reciprocating rectilinear movement and the other for providing its rotation.

SUMMARY OF THE INVENTION

The present invention has as object an electromechanical printing device having the advantage of using only a single rotary motor for controlling both the advance of the paper and the movement of the printing head which results in lower construction costs and further requiring only rotation of the roller, which simplifies the drive system so as to allow ready removal of the roller in order to handle the paper sheet.

The invention provides an electromechanical printing device for a printer of the series-parallel type comprising:

a printing head;

a roller supporting a sheet to be printed;

a rotary motor;

first transmission means for transforming the rotary movement generated by the motor into a rotational movement of the roller about its axis so as to cause the sheet to advance;

second transmission means for transforming the rotary movement generated by the motor into a reciprocating rectilinear movement applied to the printing head, perpendicular to and synchronous with the movement of the sheet.

BRIEF DESCRIPTION OF THE DRAWINGS

The invention will be better understood and other characteristics will appear from the description and drawings relating thereto in which.

DESCRIPTION OF THE PREFERRED EMBODIMENT

Figure 1:
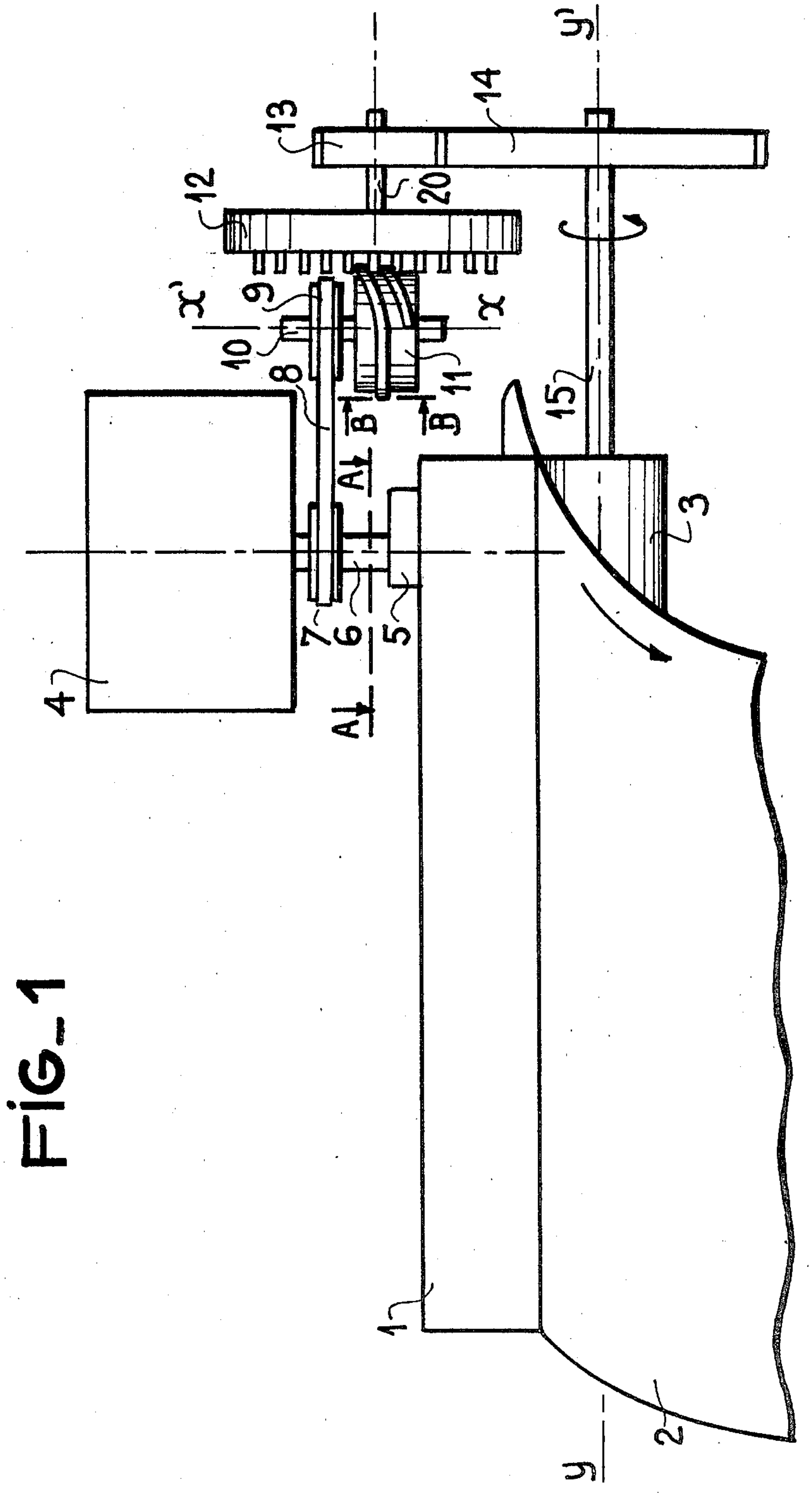
FIG. 1 is one example of an embodiment of the device of the invention.

FIG. 1 shows one embodiment of the device of the invention for a thermal printer of the series-parallel type whose printing head has the width of a line and is provided with n electrodes (not shown); each electrode being able to print two dots for a movement of the printing head over a distance equal to half the gap separating two consecutive electrodes.

This device comprises a rotary stepper motor 4, a thermal printing head 1 for printing a sheet of electrosensitive paper 2, a roller 3 on which the sheet of paper 2 is placed, and transmission means transforming the rotary movement imparted by motor 4, on the one hand, into a reciprocating rectilinear movement driving printing head 1 and, on the other hand, into a rotary movement driving roller 3. The direction of the reciprocating rectilinear movement imparted to the printing head 1 is y'y. This direction is parallel to the lines of printing on sheet 2 and to the rotational axis of roller 3. The result is that rotation of roller 3 causes movement of the sheet of paper in a direction perpendicular to the printing lines.

The principle used for the transmission means of the device consists in synchronizing the movements of printing head 1 and roller 3 so as to allow the paper to advance at the end of the printing of one line and before the printing of a new line.

The movement of printing head 1 is generated by eccentric 5 placed inside an aperture provided in the printing head 1. In fact, this eccentric 5 is coupled to motor 4 by means of a transmission shaft 6 which corresponds to the rotational axis of the eccentric 5 and to the shaft of motor 4. It follows that the eccentric 5 transforms the step by step rotational movement generated by motor 4 into a reciprocating rectilinear movement, along direction y'y, driving the printing head 1. The movement of printing head 1 occurs from a first endmost position (position 1) to a second endmost position (position 2). The step of motor 4 is 90° and the number of times this motor stops during a cycle of the translational movement of printing head 1 is four. Each stop of the motor corresponds to an endmost position of printing head 1. FIGS. *2a, 2b, 2c* and *2d* show better the movement actuating printing head 1. In these figures there are shown the printing head 1, the transmission shaft 6, the eccentric 5 and the rectangular section 30 of the aperture provided in printing head 1, seen from the plane of section AA of FIG. 1.

In these figures, there has also been shown an orthogonal reference $OX_1X_1$ whose origin O corresponds to the center of the section of the transmission shaft 6. This reference is only used to show the rotary movement of eccentric 5. Times $t_1$, $t_2$, $t_3$ and $t_4$ correspond to the four times when motor 4 stops during a cycle of the translational movement of printing head 1.

Figure 2:
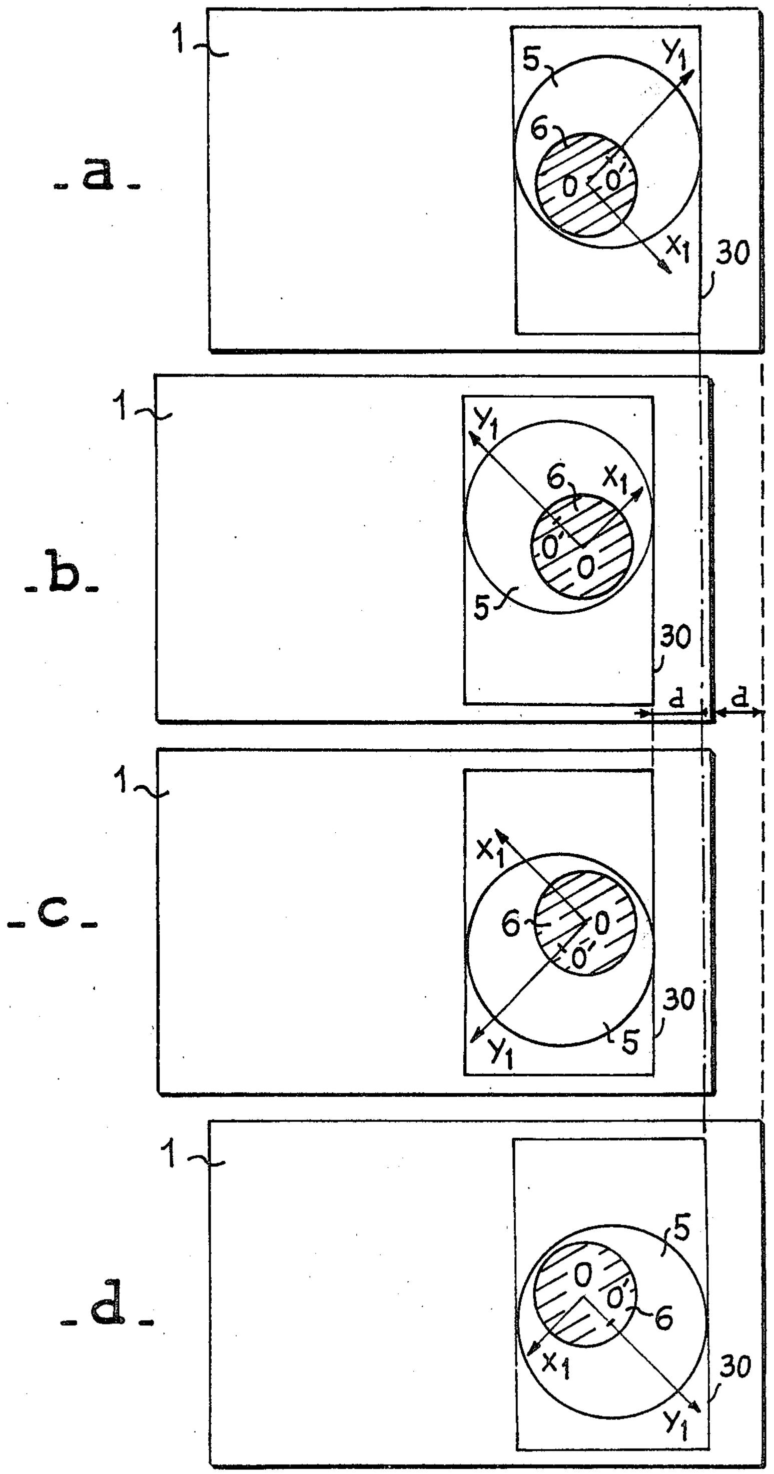
FIGS. 2 and 3 show parts of the device seen in sectional planes in FIG. 1.

FIG. *2a* corresponds to the position of printing head 1 at time $t_1$. This position is the first endmost position of printing head 1, i.e. position 1. Between times $t_1$ and $t_2$, transmission shaft 6 rotates by 90° and causes a linear movement of printing head 1. This movement has an amplitude d. At time $t_2$ eccentric 5 and printing head 1 are in the position shown in FIG. 2*b*. This position corresponds to the second endmost position of the printing head 1, i.e. position 2. Between times $t_2$ and $t_3$, the transmission shaft 6 again rotates by 90°, but this rotation does not cause translation of printing head 1. At time $t_3$, printing head 1 is then still in position 2 as shown in FIG. 2*c*. Between times $t_3$ and $t_4$, transmission shaft 6 again rotates by 90°. This time, printing head 1 is moved from position 2 to position 1. At time $t_4$, printing head 1 is then in the position 1 as shown in FIG. 2*d*. Finally, between time $t_4$ and time $t_1$ of the following cycle, there occurs a further rotation through 90° of transmission shaft 6. At time $t_1$ of the following cycle, the position of printing head 1 is then again that shown in FIG. 2*a*, i.e. position 1. The cyclical movement then continues as has been described.

The electrodes of printing head 1 are controlled so as to print the sheet at the characteristic times $t_1$, $t_2$, $t_3$ and $t_4$ of each cycle of the movement of printing head 1. In fact, these times correspond on the one hand to the times when printing head 1 is stopped and on the other hand to the endmost position of printing head 1. For each line of printing, it is necessary for each electrode to be able to print two different dots. The method consists in giving a first printing order to the n electrodes at time $t_1$, moving the printing head 1 between times $t_1$ and time $t_2$, giving a second printing order to the n electrodes at time $t_2$, controlling an advance of the printing sheet between times $t_2$ and $t_3$ so as to present to the n electrodes a blank printing line and so on. To implement this method with a single motor 4, there has been provided between motor 4 and roller 3 transmission means which transform the rotary movement of motor 4 into a rotary movement driving roller 3 only between, on the one hand, times $t_2$ and $t_3$ and, on the other, times $t_4$ and $t_1$ of the rotational cycle of motor 4. Thus the advance of the sheet will be controlled between the end of the printing of each line and the beginning of the printing of the following line.

The transmission means for implementing this method are shown in FIG. 1. In this figure, it can be seen that motor 4 is coupled to roller 3 through a transmission formed from: a first synchronous pulley 7 whose rotational axis corresponds to shaft 6 and a second synchronous pulley 9 coupled to synchronous pulley 7 through the serrated belt 8, an endless screw 11 whose axis of rotation 10 along direction x'x corresponds to the axis of rotation of pulley 9, a gear wheel 12 meshing with endless screw 11, a gear wheel 13 whose axis of rotation 20 corresponds to the axis of rotation of gear wheel 12, a gear wheel 14 meshing with gear wheel 13 and having an axis of rotation 15 corresponding to the axis of rotation of roller 3.

The transmission formed by pulleys 7 and 9, transmission shaft 6, shaft 10 and the serrated belt 8 functions to drive endless screw 11 with a rotational movement about shaft 10. The gear ratio of this gearing is 1, so that a 90° rotation of screw 11 corresponds to a 90° rotation of the shaft of motor 4. As for the gearing formed by gear wheels 13 and 14 and transmission shafts 15 and 20, it serves for driving roller 3 with a rotational movement about axis 15. To each gearing step of gear wheel 12 there corresponds a rotation of roller 3 which causes sheet 2 to advance over a length equal to the gap between two consecutive printing lines.

The gearing relative to gear wheel 12 and endless screw 11 is the most complex. To better understand its working, this gearing has been shown in FIG. 3, seen from the plane of section BB of FIG. 1.

Figure 3:
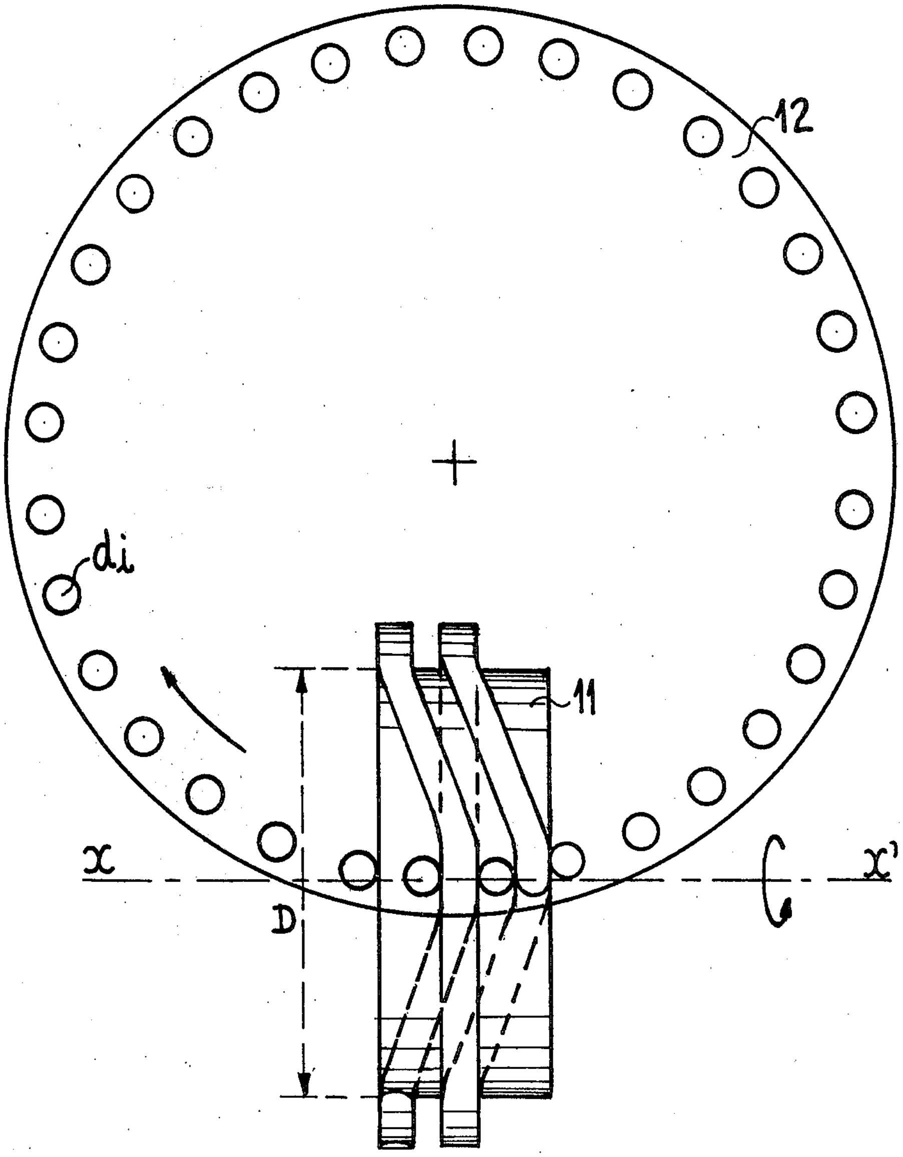

The face of gear wheel 12 which is seen from this sectional plane BB comprises the totality of teeth $d_i$ (i varying from 1 to 32). These teeth $d_i$ have a cylindrical shape. They are spread out along a concentric circle at the circumference of the wheel and mesh successively in the thread of the endless screw 11. The form of the thread is alternately helical and circular. The timing of the change of shape of the thread corresponds to a quadrant of screw 11. In fact, as shown in FIG. 3, the thread of screw 11 is circular over a quadrant of the screw, helical over the next quadrant and then circular and so on. It may then be considered that the screw comprises an active part formed from the two quadrants comprising the helical shaped thread and an inactive part formed from the two quadrants comprising the circular shaped thread. To the successive rotational steps of screw 11 there correspond alternately a quadrant comprising the circular shaped thread and a quadrant comprising the helical shaped thread. Screw 11 is previously positioned so that the active part of the screw corresponds to a rotational step of motor 4 occurring either between times $t_2$ and $t_3$ or between times $t_4$ and $t_1$ of each cycle of rotation and that the inactive part corresponds to the rotational step occurring either between times $t_1$ and $t_2$ or between times $t_3$ and $t_4$. Thus, screw 11 only causes gear wheel 12 to rotate and so sheet 2 to advance between times $t_2$ and $t_3$ and between times $t_4$ and $t_1$ of each cycle of rotation of motor 4.

The operation of the printing device of the invention during a rotational cycle of motor 4 can be summed up in the following way:

Time $t_1$: printing head 1 is in position 1; the n electrodes are controlled so as to print at most n dots along a line x of sheet 3.

Between times $t_1$ and $t_2$: printing head 1 is moved from position 1 to position 2. Sheet 3 is not moved.

Time $t_2$: printing head 1 is in position 2; the n electrodes are controlled so as to print at most n dots along line x of sheet 3.

Between times $t_2$ and $t_3$: the sheet of paper 3 is advanced. The printing head 1 remains in position 2.

Time $t_3$: printing head 1 is in position 2; the n electrodes are controlled to print at most n dots along line z following line x.

Between times $t_3$ and $t_4$: printing head 1 is moved from position 2 to position 1. The sheet of paper 3 is not advanced.

Time $t_4$: printing head 1 is in position 1; the n electrodes are controlled for a new printing of line z.

Between time $t_4$ and time $t_1$ of a new cycle of rotation: printing head 1 remains in position 1, sheet 3 is advanced. Then the cycle of the movement is repeated.

For handling the sheet of paper 2, for example when a new roll of paper is fitted, roller 3 may be easily moved away from printing head 1. Gear wheels 13 and 14 form a convenient means for imparting a rotational movement to roller 3 while still allowing it to be moved away from printing head 1.

It is within the scope of a man skilled in the art to use other means for achieving this transmission of a synchronous rotational movement, more particularly by using two synchronous pulleys connected together by a serrated belt.

The invention is not limited to the embodiments described and shown. In particular, it is within the scope of a man skilled in the art to provide gearing other than those described without departing from the scope and spirit of the invention.

What is claimed is:

1. An electromechanical printing device for a printer of the series-parallel type, comprising:

a printing head;

a roller supporting a sheet to be printed;

a rotary stepper motor;

first transmission means for transforming the rotary movement generated by the motor into a rotational movement of the roller about its axis, so as to cause said sheet to advance; and second transmission means for transforming the rotary movement generated by said motor into a reciprocating rectilinear movement applied to the printing head, perpendicular to and synchronous with the movement of said sheet;

said second transmission means comprising an eccentric mounted on the shaft of the motor and placed in an aperture provided in the printing head;

said first transmission means comprising means coupled to said motor so as to transmit only one rotational step out of two and to transform it into a rotational movement applied to said roller, said last-mentioned means comprising:

an endless screw having a thread formed of several sectors alternately circular in shape and helical in shape, each sector corresponding to a step of the motor;

transmission means for transmitting the rotational movement of the motor to the endless screw; and a gear wheel, meshing with said endless screw and coupled to said roller so as to impart thereto a rotational movement.

* * * * *